United States Patent
Chalberg et al.

(10) Patent No.: US 7,191,998 B1
(45) Date of Patent: Mar. 20, 2007

(54) METHOD AND APPARATUS FOR MOUNTING AN ELECTRIC WATER PUMP

(75) Inventors: Philip E. Chalberg, Costa Mesa, CA (US); Patrick B. Healy, Costa Mesa, CA (US)

(73) Assignee: Hydrabaths, Inc.

( * ) Notice: Subject to any disclaimer, the term of this patent is extended or adjusted under 35 U.S.C. 154(b) by 0 days.

(21) Appl. No.: 09/577,311

(22) Filed: May 23, 2000

(51) Int. Cl.
  *A47K 3/00* (2006.01)

(52) U.S. Cl. ............... 248/676; 248/674; 248/225.21; 4/541.1

(58) Field of Classification Search ............... 248/679, 248/125.1, 207, 220.31, 673, 680, 396.01, 248/225.11, 225.21
See application file for complete search history.

(56) References Cited

U.S. PATENT DOCUMENTS

| | | | |
|---|---|---|---|
| 1,439,044 A * | 12/1922 | White | |
| 3,163,132 A * | 12/1964 | Nelson | 108/152 |
| 3,483,434 A | 12/1969 | Koertge | |
| 3,851,222 A | 11/1974 | Micjalak et al. | |
| 3,903,443 A | 9/1975 | Carlson | |
| 3,983,429 A | 9/1976 | Allardice, Jr. | |
| 4,012,021 A | 3/1977 | Duceppe | |
| 4,019,704 A * | 4/1977 | Levine | 248/16 |
| 4,033,531 A | 7/1977 | Levine | |
| 4,174,821 A | 11/1979 | Levine | |
| 4,260,125 A | 4/1981 | Levine | |
| 4,339,102 A * | 7/1982 | Schweitzer | 248/221.1 |
| 4,455,011 A | 6/1984 | Levine | |
| 4,817,907 A | 4/1989 | Cougan | |
| 4,877,984 A | 10/1989 | Colwell et al. | |
| 5,033,711 A | 7/1991 | Gregorich et al. | |
| 5,069,415 A | 12/1991 | Mechalas | |
| 5,240,216 A | 8/1993 | Lin et al. | |
| 5,488,259 A | 1/1996 | Cho | |
| 5,600,926 A | 2/1997 | Ehrlich | |
| 5,709,359 A | 1/1998 | Riley | |
| 5,725,190 A | 3/1998 | Cuthbertson et al. | |
| 5,803,274 A * | 9/1998 | Scheveloff | 211/87 |
| 5,855,354 A * | 1/1999 | Fisher et al. | 248/674 |
| 5,975,480 A | 11/1999 | Schaefer et al. | |
| 6,002,586 A | 12/1999 | Chen et al. | |
| 6,011,336 A | 1/2000 | Mathis et al. | |

* cited by examiner

*Primary Examiner*—Carl D. Friedman
*Assistant Examiner*—Steven M. Marsh
(74) *Attorney, Agent, or Firm*—Leonard Tachner

(57) ABSTRACT

A method and apparatus for mounting an electric water pump adjacent the exterior wall of a bathtub or the like. The pump is fitted with mounting brackets having hooks and a separate mounting stand is provided to received those hooks and thus secure the pump at a desired location. The stand comprises an integral bottom plate and vertical plate preferably at right angles to one another. The vertical plate has numerous hook hanger slots located virtually from the bottom to the top of the plate and provided in numerous columns and rows to receive the hooks on the pump mounting plates. On the illustrated embodiment of the vertical plate there are 90 such hook hanger slots distributed in two spaced sections. A first section receives two hooks from one of the pump mounting brackets and a second section receives two hooks from another of the pump mounting brackets. The spacing between sections corresponds to the spacing between brackets and the spacing between hook hanger slots in each section corresponds to the spacing between hooks on each bracket. The pump may, consequently, be mounted at multiple height locations along a substantial extent of the vertical plate. The multiple columns of slots provide suitable mounting for pumps having different spacing between mounting brackets.

11 Claims, 3 Drawing Sheets

METHOD AND APPARATUS FOR MOUNTING AN ELECTRIC WATER PUMP

BACKGROUND OF THE INVENTION

1. Field of the Invention

The present invention relates generally to the positioning and mounting of electric water pumps. The invention relates more specifically to the use of a unique pump mounting stand and pump-integrated mounting plates to position an electric water pump at a selected location along each of three orthogonal axes.

2. Background Art

It is often necessary to position an electric water pump at a selected location along a vertical axis as well as along X and Y axes in one plane along an underlying surface. One such application is in the installation of a whirlpool bath system and in and around the exterior of a wall of a water enclosure such as a bathtub or the like. In order to provide unobstructed paths for water and air pipes, it is sometimes necessary to position a water pump adjacent the tub wall but elevated above the surface underlying the tub. Connecting the pump directly to the tub wall would not be practical. It would increase the noise and vibration effects of the pump and it would require putting holes in the tub wall which would be inimical to the water holding integrity of the tub and to the aesthetics of the entire system. Thus there is a need for a method and apparatus which permits the mounting of an electric pump along the exterior wall of a tub wherein the pump may be located at selected positions along the length and height of the tub wall as well as along a direction perpendicular to the tub wall; in other words, anywhere along three orthogonal axes relative to the exterior tub wall.

A search of the prior art has revealed the following issued U.S. patents which may be deemed pertinent:

U.S. Pat. No. 3,483,434 Koertge
U.S. Pat. No. 3,851,222 Michalak et al
U.S. Pat. No. 3,903,443 Carlson
U.S. Pat. No. 3,983,429 Allardice, Jr.
U.S. Pat. No. 4,012,021 Duceppe
U.S. Pat. No. 4,033,531 Levine
U.S. Pat. No. 4,174,821 Levine
U.S. Pat. No. 4,260,125 Levine
U.S. Pat. No. 4,455,011 Levine
U.S. Pat. No. 4,817,907 Cougan
U.S. Pat. No. 4,877,984 Colwell et al
U.S. Pat. No. 5,033,711 Gregorich et al
U.S. Pat. No. 5,069,415 Mechalas
U.S. Pat. No. 5,240,216 Lin et al
U.S. Pat. No. 5,488,259 Cho
U.S. Pat. No. 5,600,926 Ehrlich
U.S. Pat. No. 5,709,359 Riley
U.S. Pat. No. 5,725,190 Cuthbertson et al
U.S. Pat. No. 5,975,480 Schaefer et al
U.S. Pat. No. 6,002,586 Chen et al
U.S. Pat. No. 6,011,336 Mathis et al Of the foregoing, the following appear to be the most relevant to the present invention:

U.S. Pat. No. 6,011,336 to Mathis et al is directed to a vibration isolating mounting for whirlpool bath and spa type motor pump installations. A vibration isolation pad 14 rests on a floor or wall surface 16 and supports a motor mount 12. The pad 14 has bumpers 40 at each corner to retain and clamp the motor mount 12 in place, needing only two through bolts 48 to retain the motor mount and isolation pad to the mounting surface.

U.S. Pat. No. 4,033,531 to Levine is directed to a kit comprising a set of brackets with a plurality of apertures in the form of slots that is adaptable for mounting a variety of equipment such as electric motors, tanks, and the like. As shown in the Drawing, the kits are adaptable to support various equipment using support brackets 18 and 20 and upper sections 28 in combination with clamp 12. The support brackets and upper sections have a plurality of elongated apertures 30 and slots 34 that can be assembled in a variety of configurations using fasteners 32.

U.S. Pat. No. 3,983,429 to Allardice Jr., is directed to an adjustable motor mount for accommodating motors of different lengths. A two-piece adjustable mounting base 10 is formed of base plate members 16, 18. The base plates have vertical supporting yokes 12, 14 that engage the motor 40 and secure it by means of clamps 30 formed of straps 32, 34. The mounting plates telescope together and are held in axial alignment by means of channel members 25, 27 which engage a sliding contact with tongue portion 23. The base plate members have a plurality of slots 21,29 that are adjusted to be superimposed in concentric alignment so that securing means such as lock bolt 31 secures the base plates 16 and 18 together and to the mounting support.

U.S. Pat. No. 5,488,259 to Cho is directed to a motor mount apparatus that can be used with motors of various sizes. The motor mount is formed of a pair of identical brackets 10, the brackets having a supporting wall 11 and two sides 13, 14 bent at 90 degrees from the supporting wall. Side 13 has a plurality of apertures 131 and side 14 has a plurality of apertures 141. The pair of brackets have their sides 13, 14 slid together so that the contact faces 111 of the ends correspond to the spacing between protrusions 2, 3 of motor 1 to be supported. Screws 20 are inserted into suitable holes 131 and 141 to interconnect the pairs of members 10 forming a box-like structure to support the motor.

U.S. Pat. Nos. 4,174,821, 4,260,125 and 4,455,011 to Levine are all directed to brackets for mounting motors. These references have a plurality of brackets 10, 24, 22 and 36 with an arrangement of slots, 12, 14, 30, 32, 34, 42, 44 and 46 that provide adjustable and versatile mounting structures for small horsepower electric motors such as fan motors. The brackets can be secured to preformed mounting holes in a motor or may be mounted to a threaded stud projecting from the motor and the brackets can be bent or deformed to enable it to be used in a versatile manner, depending on installation requirements.

All of the aforementioned prior art fails to provide a simple, low cost and convenient way to mount an electric water pump at any location along three orthogonal axes adjacent the exterior wall of a tub for use in whirlpool bath systems.

SUMMARY OF THE INVENTION

The present invention satisfies the aforementioned need by providing in a preferred embodiment, a method and apparatus for mounting an electric water pump adjacent the exterior wall of a bathtub or the like. More specifically, in the embodiment disclosed herein, the pump is fitted with mounting brackets having hooks and a separate mounting stand is provided to receive those hooks and thus secure the pump at a desired location. The stand comprises an integral bottom plate and vertical plate preferably at right angles to one another. The vertical plate has numerous hook hanger slots located virtually from the bottom to the top of the plate and provided in numerous columns and rows to receive the hooks on the pump mounting plates. On the illustrated embodiment of the vertical plate there are 90 such hook hanger slots distributed in two spaced sections. A first section receives two hooks from one of the pump mounting brackets and a second section receives two hooks from another of the pump mounting brackets. The spacing between sections corresponds to the spacing between brackets and the spacing between hook hanger slots in each section corresponds to the spacing between hooks on each bracket. The pump may, consequently, be mounted at multiple height locations along a substantial extent of the vertical plate. Multiple columns of slots permit accommodation of different size pumps. Furthermore, the stand is readily moveable along the tub wall exterior both parallel to the wall and perpendicular to the wall. The bottom plate is provided with elongated slots and apertures for being fastened to an underlying surface if so desired. Moreover, at least some of the hooks have holes for receiving a fastening device to further secure the pump to the stand if so desired. However, because the weight of the hanging pump is countered by the bottom plate, the combined pump and stand is relatively stable.

OBJECTS OF THE INVENTION

It is therefore a principal object of the present invention to provide a method and apparatus for mounting an electric pump or any other electric motor operated device at a selected location including a selected height above an underlying surface.

It is another object of the invention to provide a combined electric motor-operated device and stand which permits the device to be located at a desired position along each of three orthogonal axes.

It is yet another object of the invention to provide a combined electric water pump and mounting stand for positioning the pump anywhere in height as well as distance from and along an exterior wall of a bathtub or other water enclosure for use in a whirlpool bath system.

It is still another object of the invention to provide a whirlpool bath system having a pump mounted on a stand which permits the pump to be selectively raised vertically adjacent the tub wall without connecting mechanically to the wall itself and without additional hardware.

It is still another object of the invention to provide a pump stand which can be used to position different size pumps along three perpendicular axes.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF A PREFERRED EMBODIMENT

Figure 1:
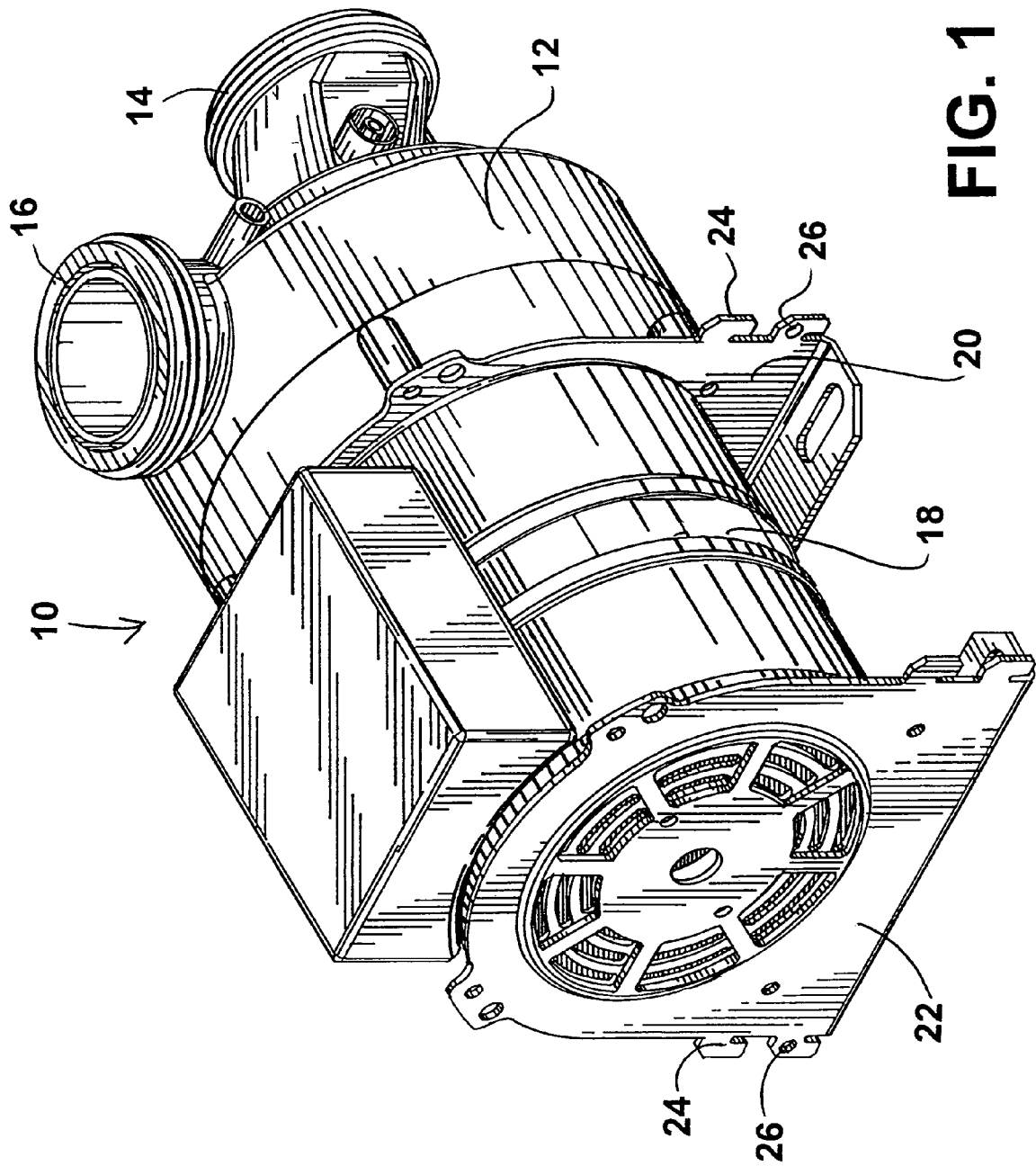
FIG. 1 is a three-dimensional view of an electric water pump configured for use in the present invention.

Referring to the accompanying drawings it will be seen that an electric water pump 10 comprises a pump portion 12, an inlet 14 and an outlet 16. Pump portion 12 is connected contiguously to a motor 18, the latter having a pair of mounting plates 20 and 22. Mounting plate 20 and 22 are conventional electric motor end plates except for integral hooks 24, a pair of which extend from each side of each mounting plate. At least one hook 24 of at least one such pair on at least one side of each such mounting plate 20 and 22, has a hole 26 for securing the pump 10 to a stand.

Figure 2:
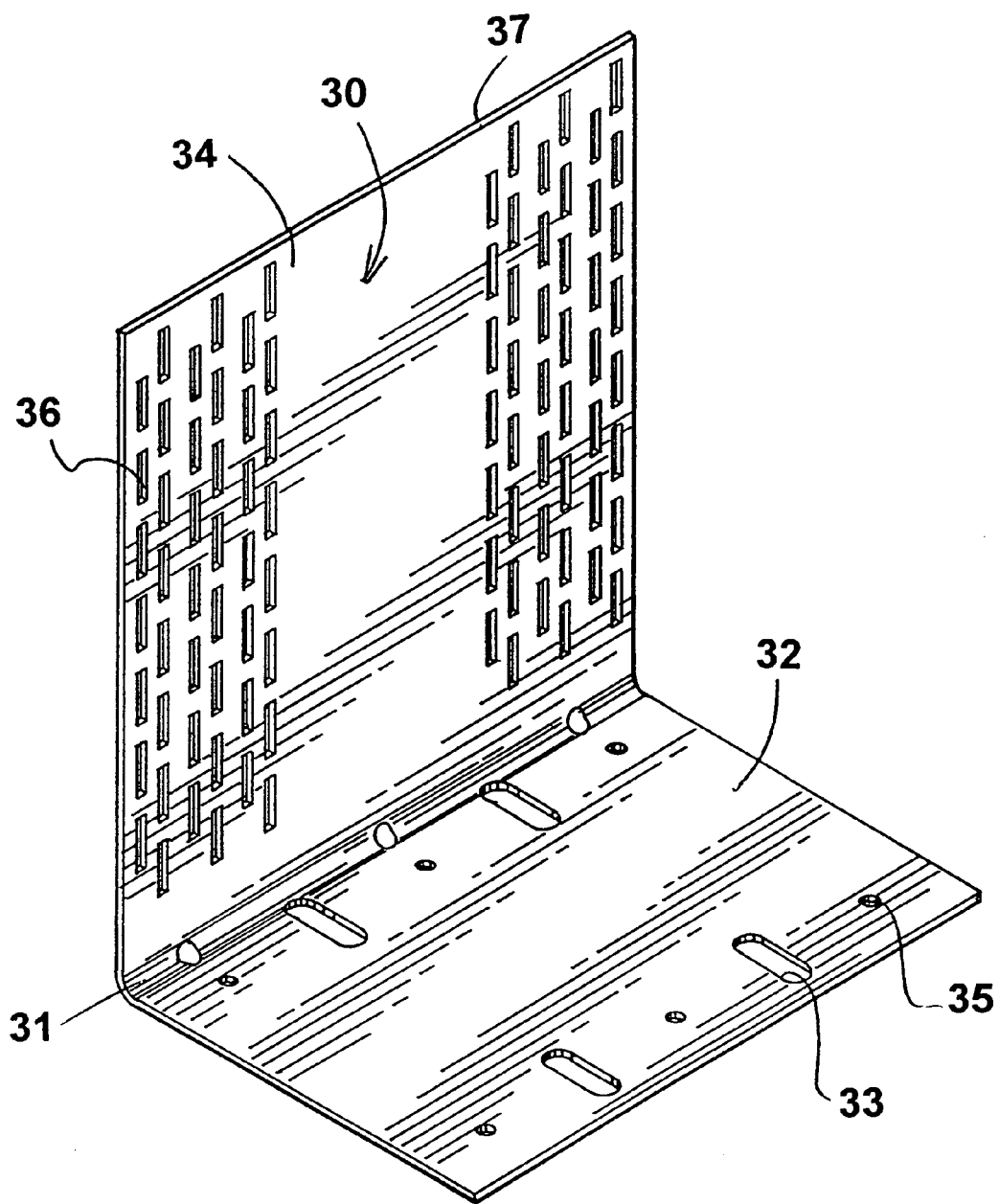
FIG. 2 is a three-dimensional view of a preferred embodiment of a pump mounting stand according to the present invention.

A pump mounting stand 30, shown best in FIG. 2, comprises a bottom or support plate 32 and a vertical or slotted plate 34. In the illustrated embodiment, plates 32 and 34 are integral portions of a unitary metal member and are bent at an axis 31 to form a right angle member wherein the plate 32 is substantially perpendicular to plate 34. Bottom plate 32 has a plurality of elongated apertures 33 and a plurality of round holes 35, both of which may be used to secure the bottom plate to an underlying surface if so desired. However, a feature of the invention is that pump mounting may be accomplished without requiring any additional hardware.

Figure 3:
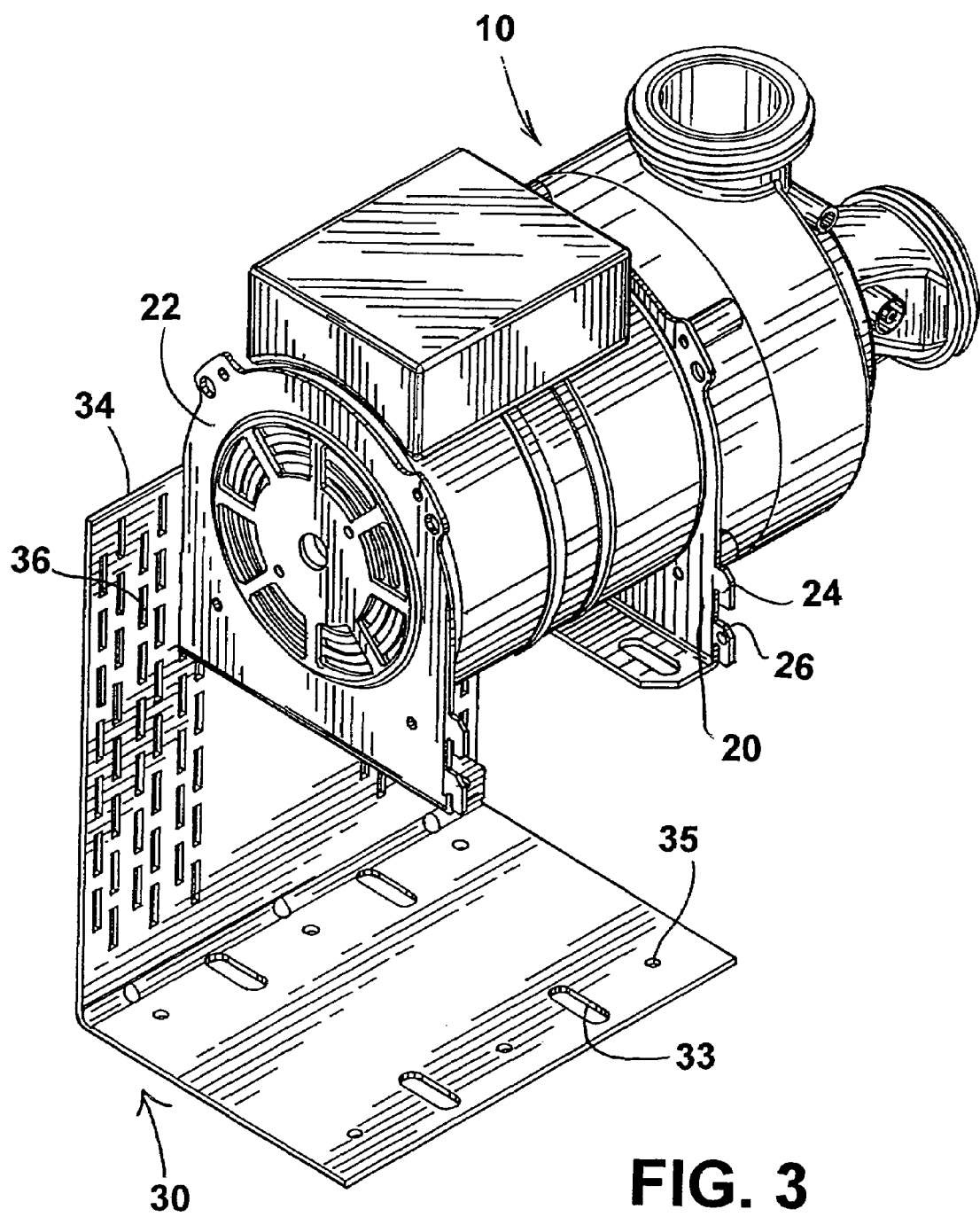
FIG. 3 is a three-dimensional view of the combination of the pump of FIG. 1 and the stand of FIG. 2 illustrating the use of the invention for raising the pump vertically.

Vertical or slotted plate 34 has two groups of slots 36 arranged in columns and rows. One such group is intended for receiving the hooks 24 of mounting plate 20 and the other such group is intended for receiving the hooks 24 of mounting plate 22. However, because mounting plates 20 and 22 have hooks 24 on both sides, the pump 10 can be mounted either in the direction shown in FIG. 3 or in the opposite direction with inlet 14 and outlet 16 on the left side of the figure instead. The vertical and transverse spacing between slots 36 in each group, are the same so that hooks 24 on both plates 20 and 22 can be inserted through any two adjacent slots 36 in any of the columns of slots on vertical plate 34. Moreover, the spacing between corresponding slots in respective groups, corresponds to the spacing between hooks 24 on respective mounting plates 20 and 22 of pump 10 for different size pumps having longer or shorter distances between plates 20 and 22. In this manner, and as depicted in FIG. 3, the hooks 24 of mounting plate 22 are inserted into slots 36 in the fifth column of the left group and hooks 24 of mounting plate 20 are inserted into the fifth column of the right group. Moreover, the hooks are inserted into slots of the two groups which are the same distance from the upper edge 37 of vertical plate 34. Thus in FIG. 3, each upper hook of the respective mounting plates is inserted into the second slot from edge 37 and each lower hook of the respective mounting plates is inserted into the third slot from edge 37. Of course, it will be understood that pump 10 may be affixed to stand 30 at virtually any desired height along vertical plate 34 as well as at any corresponding slots 36 parallel to edge 37. Furthermore, the combined pump and stand may be located at any selected position relative to another object such as an adjacent bathtub wall. Once the pump hooks are inserted in the stand slots, a fastener may be inserted into a selected hole 26 to further secure the pump to the stand.

It will be understood that while the preferred embodiment employs slots on mounting stand 30 and hooks on motor plates 20 and 22, the opposite configuration would also provide the benefits of the invention. Thus for example, a stand having hooks and a motor having plates with slots on flanges extending perpendicular to the plates, would provide a viable alternative embodiment of the invention.

Having thus disclosed a preferred embodiment of the invention, it being understood that numerous modifications and additions may be made to the illustrated embodiment and that such modifications and additions will now be apparent to those having the benefit of the above disclosure.

What is claimed is:

1. A cantilever apparatus for holding and positioning an electric motor-operated device in each of three orthogonal directions; the apparatus comprising:

a stand having a support plate and a slotted plate, the slotted plate extending substantially perpendicular to said support plate and being affixed thereto;

said slotted plate having at least four columns of elongated slots, each said column having a plurality of elongated slots at selected spaced-apart locations, some of said slots being further from said support plate than others of said slots, a first pair of said columns being spaced from each other the same distance as a second pair of columns are spaced from each other;

an electric motor-operated device; and at least one hook extending from said device for insertion through a selected one of said slots for hanging said device on said stand on a selected one of said first and second pairs of columns.

2. The apparatus recited in claim 1 wherein said support plate and said slotted plate are integral to one another being formed from a unitary member.

3. The apparatus recited in claim 1 wherein said device comprises at least one mounting plate and said at least one hook extends from said at least one mounting plate.

4. The apparatus recited in claim 1 wherein said device comprises an electric water pump.

5. The apparatus recited in claim 1 wherein one of said orthogonal directions is perpendicular to said support plate.

6. In a whirlpool bath system installed in a tub and having an electric water pump adjacent an exterior wall of the tub, a cantilever apparatus for supporting the pump above and spaced from a surface underlying the tub; the apparatus comprising:

a stand having a support plate and a slotted plate, the slotted plate extending substantially perpendicular to said support plate and being affixed thereto;

said slotted plate having a plurality of elongated slots arranged in at least four columns at selected spaced-apart locations, some of said slots being further from said support plate than others of said slots, a first pair of said columns being spaced from each other the same distance as a second pair of columns are spaced from each other;

at least one hook extending from the pump for insertion through a selected one of said slots for hanging the pump on the stand on a selected one of said first and second pairs of columns.

7. The apparatus recited in claim 6 wherein said support plate and said slotted plate are integral to one another being formed from a unitary member.

8. The apparatus recited in claim 6 wherein said pump comprises at least one mounting plate and said at least one hook extends from said at least one mounting plate.

9. A method for positioning an electric water pump adjacent a tub wall in an elevated and cantilevered position; the method comprising the steps of:

a) forming a stand by bending a unitary planar member to provide a support plate and an attachment plate which is substantially perpendicular to said support plate;

b) providing a plurality of columns of slots in said attachment plate;

c) placing said stand adjacent said tub wall with the attachment plate generally parallel to the tub wall;

d) forming at least one hook integrally to said pump; and e) mating said at least one hook and one of said slots, with the pump being cantilevered above said stand.

10. The method recited in claim 9 wherein step b) comprises the step of providing some of slots further from said support plate than others of said slots to provide different selectable levels of elevation for said pump.

11. The method recited in claim 9 wherein step d) comprises the step of forming said hook as a rigid extension of said pump.

* * * * *